Sept. 20, 1971     D. FIRTH     3,605,440
FLEXIBLE COUPLING
Filed May 4, 1970     2 Sheets-Sheet 1
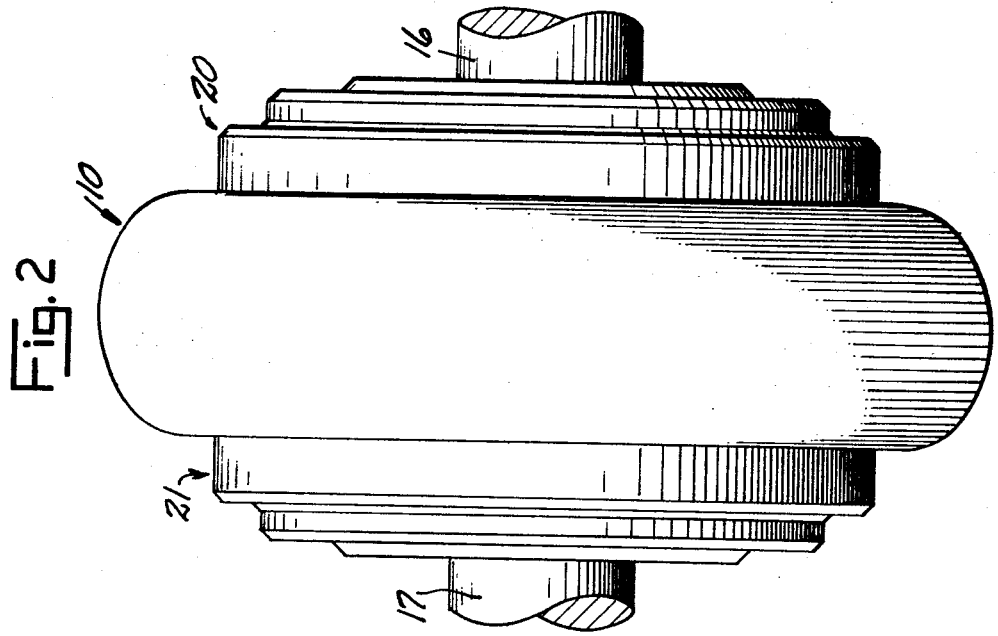
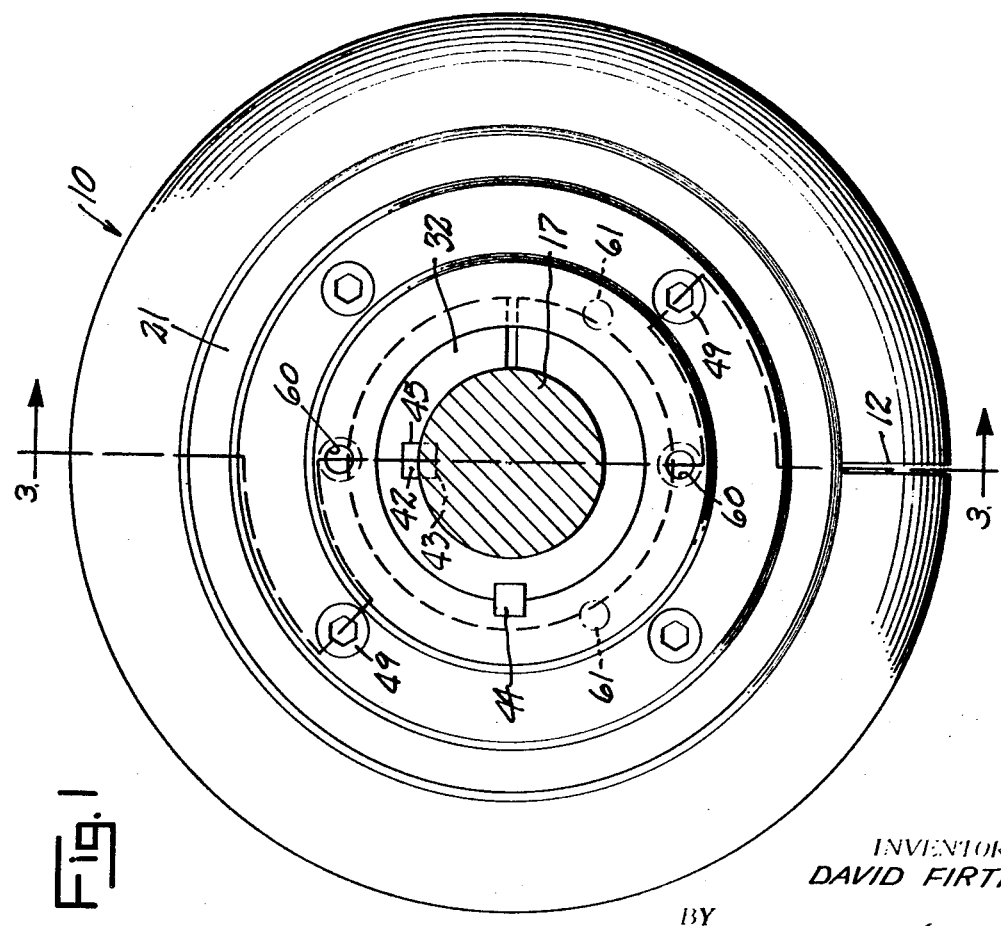
INVENTOR
DAVID FIRTH
BY
ATTORNEYS

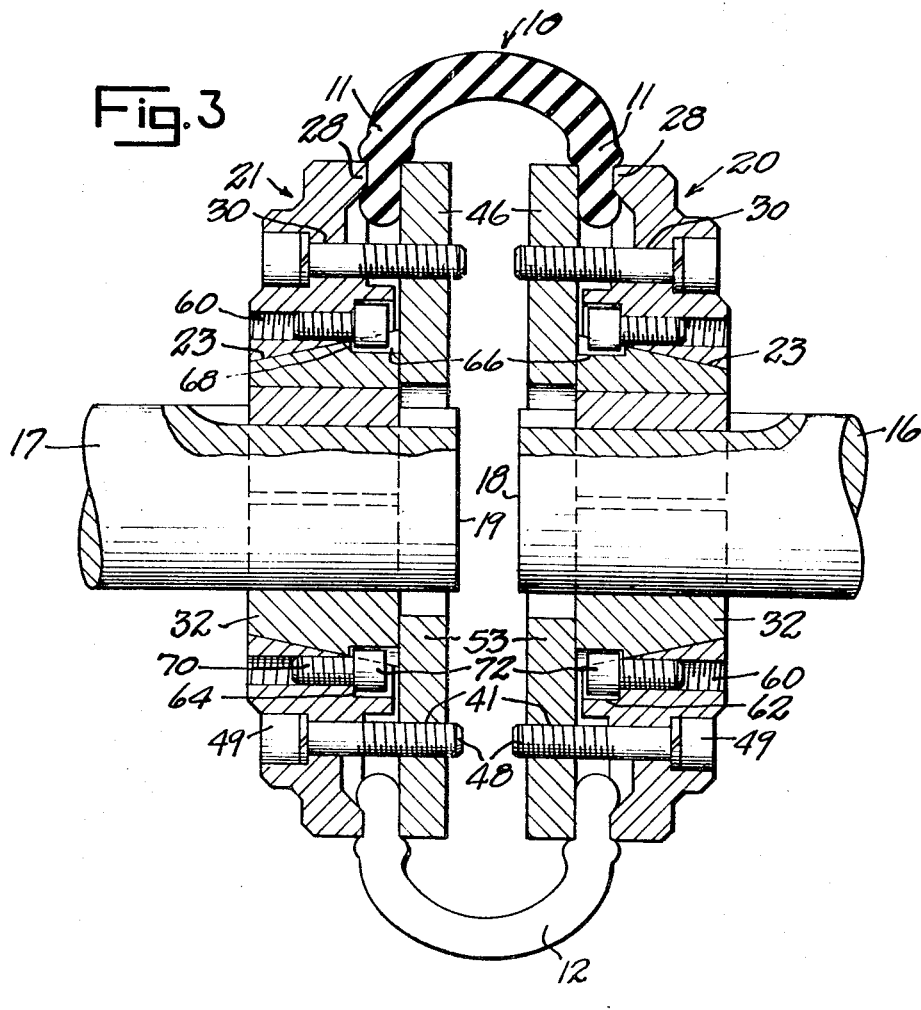
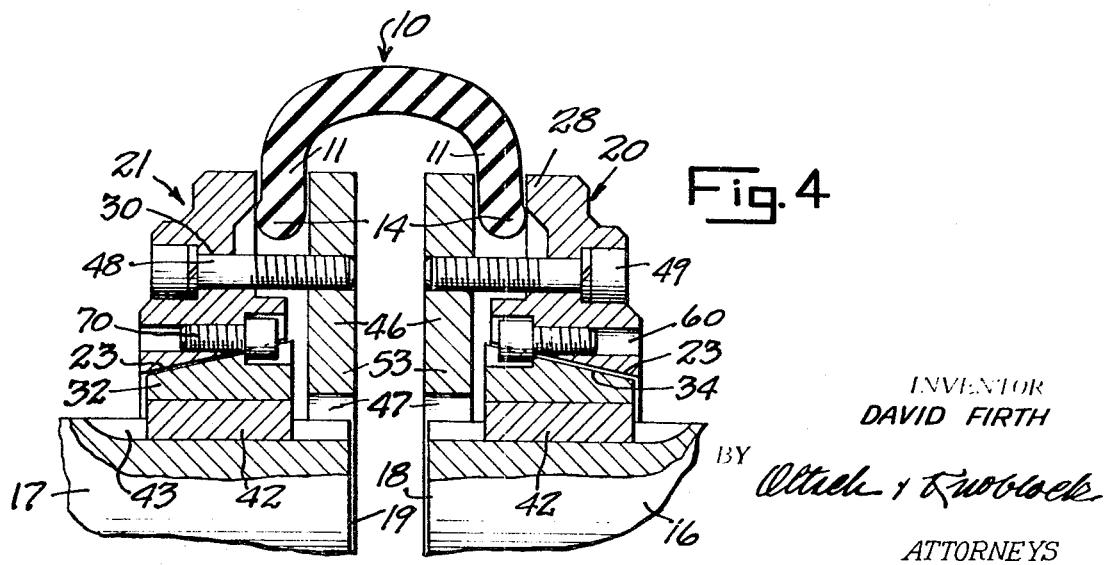

United States Patent Office 3,605,440
Patented Sept. 20, 1971

3,605,440
FLEXIBLE COUPLING
David Firth, 1441 E. Jefferson Blvd.,
South Bend, Ind. 46617
Filed May 4, 1970, Ser. No. 34,024
Int. Cl. F16d 3/52
U.S. Cl. 64—11R          5 Claims

ABSTRACT OF THE DISCLOSURE

A flexible coupling wherein a pair of hub members having tapered bores each encircles a split tapered bushing projecting axially from one side thereof and having a normal slide fit on a shaft. An annular clamp plate is carried by each hub member and has an inner marginal portion abutting the projecting end of the adjacent bushing and an outer marginal portion for clamping a margin of a flexible annular torque-transmitting member against a margin of the cooperating hub member when advanced toward said hub member, whereby to connect said bushing, hub and flexible member in drive-transmitting relation. Connector means are carried by each hub and engage the associated bushing to define a sub-assembly of a bushing, a hub and a clamp plate which accommodates limited relative axial movement of said hub and bushing and maintains the same in substantially coaxial relation at all times.

This invention relates to improvements in flexible couplings and more particularly to flexible couplings of the type in which one of a pair of hubs is mounted on the end of each of a pair of aligned shafts by means of tapered split bushings and the hubs are interconnected by resilient torque-transmitting members of arcuate cross section whose opposite margins are clamped to the respective hubs by means of clamping plates. In these devices the parts are so arranged that advance of the clamping plate toward a hub to clamp a margin of the resilient member also entails advance of the tapered split bushing in the hub for the purpose of establishing a driving connection between the shaft and the hub.

In particular, this invention relates to an improvement upon the flexible coupling forming the subject matter of my U.S. Pat. No. 3,486,348, dated Dec. 30, 1969, wherein the preferred construction entails the use of tapered bushings having a taper of an angle of 14° or greater relative to the axis of the bushing so that the tapered bushing will not wedge in the hub. Thus, upon release of a clamping plate from clamping engagement with the resilient torque-transmitting element, as for the purpose of disconnecting a joint between shafts or for the purpose of replacement of the resilient member, the release of the clamping action upon the resilient member will be accompanied by freeing of the tapered bushing from frictional engagement with the hub and the shaft, thus allowing the shaft mounting the hub to be released or withdrawn from the coupling.

Devices of this character have substantial advantages over prior types of flexible couplings utilizing resilient torque-transmitting elements clamped to or interconnecting spaced hubs. However, the large angle of taper required to produce these advantages may introduce an undesirable factor, in that it may permit the part of one or both of the clamping units to shift relative to required concentric relation. Such shifting makes it difficult to properly assemble the resilient torque-transmitting element with the two clamping units of the coupling.

Therefore, it is the primary object of this invention to provide a flexible coupling wherein the relatively shiftable parts of each of two clamping units which are to be interconnected by a resilient element are maintained in substantially concentric relation to each other and to the shafts on which they are to be mounted during assembly and disassembly of the coupling.

A further object is to provide a flexible coupling of this character which can be rapidly and easily assembled and secured upon shafts to be coupled.

A further object is to provide a device of this character which is simple in construction, inexpensive, and easily and quickly installed by persons of limited mechanical skill and dexterity.

Other objects will be apparent from the following specification.

In the drawings:

FIG. 1 is an end elevation of my new coupling.

FIG. 2 is a view of the coupling in side elevation.

FIG. 3 is an axial sectional view of the coupying taken on line 3—3 of FIG. 1.

FIG. 4 is a fragmentary axial sectional view of the coupling showing the parts of the coupling mounted upon the respective shafts in loose condition preparatory to manipulation to operative position.

The invention relates to a flexible coupling for connecting two substantially aligned rotatable shafts, wherein complementary hubs, each having a tapered bore, encircle the ends of the shafts to be coupled, with each confronting the complementary hub. A split-tapered bushing is positioned within each hub and encircles a shaft. Clamp means are carried by each hub to clamp a rim of a resilient coupling or torque-transmitting element to a hub and also to advance the hub bushing relative to the hub for effecting clamping of the bushing upon the hub-mounting shaft. Means are provided to yieldably interconnect each hub with its bushing to accommodate relative axial movement of the hub and the bushing for purposes of retaining and releasing of the coupling parts, while at the same time maintaining the hub and the bushing in substantially concentric relation to each other and to the clamping plate.

The flexible coupling here chosen for illustration includes two hubs 20 and 21 interconnected by a flexible tire-like torque-transmitting member 10, and each encircling one of two rotatable shafts 16 and 17 to be coupled which are arranged substantially in axial alignment with their adjacent ends 18 and 19 spaced apart. One of the shafts 16 and 17 may be a driving shaft, and the other a driven shaft. Also, the shafts 16 and 17 may be of different diameters.

Each of the hubs 20 and 21 is a rigid annular part having an axial aperture or bore 23 of tapered or frusto conical shape having its large diameter end innermost in use, that is, adjacent to the end of the shaft on which it is mounted. The outer circumferential margin of each of the hubs 20–21 is preferably of reduced cross-section or thickness with its innermost marginal face of stepped configuration and provided with an annular rib 28 projecting axially inwardly from the adjacent inner face portion of the hub. Rib 28 may be of arcuate or other cross section. Each of the hubs 20–21 has a plurality of apertures or bores 30 extending therethrough intermediate its inner and outer diameters and preferably arranged in a circular series in which the bores are disposed substantially equiangularly and are spaced equally from bore 23 and from rib 28.

Disposed within the axial bore 23 of each hub 20–21 is a tapered split bushing 32 having an outer conical surface which is preferably complementary to the tapered wall 23 of the axial aperture of the hub within which it fits. The included angle of taper of the conical surface 34 of bushing 32 and of the tapered circular wall 23 of each of the hubs 20–21 is the same and may vary in a range between 14° and 60°. Thus, the taper is of such an angle that, upon release of means for holding the bushing 32 in clamping position within the hub bore 23 and upon the mounting shaft, the bushing 32 will free itself from the hub and from its mounting shaft without assistance, or with minimum assistance. The split bushing 32 may be formed of one integral piece or may consist of a plurality of arcuate sections.

Each bushing 32 is mounted upon the end portion of one of the shafts 16–17, and preferably has a normal slight clearance with the mounting shaft in the unflexed condition of the bushing, such as a clearance in the order of .002″ to .004″. The axial dimension of the bushing 32 is preferably equal to or slightly greater than the axial dimension of the part of the hub in which the bore 23 is formed. The normal outer diameter of the bushing 32 at the large diameter end thereof is preferably slightly greater than the large diameter end of the bore 23 of the hub. The arrangement is such that the inner large diameter end portion of each bushing 32 will normally project beyond the interior face of the adjacent or thick central part of the hub in which it is mounted when the hub and bushing are interlocked with the shaft.

Each of the shafts 16 and 17 and the bushing 32 mounted thereon may have complementary longitudinal slots 43 and 45 formed in the shaft and in bushing 32 respectively, to receive a key or spline 42. Similarly, each hub and its bushing may be slotted to receive a spline 44. It will be understood that in applications involving the transmission of low torque between shafts, it will not be necessary to key the shaft, the bushing and the hub.

Each of the complementary parts or units of the coupling, consisting of a hub and a bushing therein, includes an annular clamp plate or ring 46 whose outer dimension or diameter is substantially the same as the outer diameter of the associated hub, so that the outer marginal portion of said clamp plate is directly opposed to the annular rib 28 of the associated hub. Each clamp plate 46 has a central aperture 47 of greater diameter than the outer diameter of any shaft on which the coupling is intended to be mounted. The inner circumferential marginal portion 53 of each clamp plate 46 confronts the inner or large diameter end face 36 of the associated bushing 32. Each clamp plate 46 has a plurality of threaded bores 41 therein, each registering with a bore 30 in the associated hub. The bores 30 in the hub are countersunk or of enlarged size at their outer ends. A screw 48, such as a cap screw, is inserted in each hub bore 30 and threads into a registering plate bore 41 which has a complementary screw thread formed therein. The head 49 of each screw abuts the recessed annular shoulder defined by the countersunk portion of the bore 30.

Each of the hubs 20–21 has a plurality of bores 60 formed therein parallel to its axis and adjacent to and interrupting the tapered bore 23 at its large diameter end. Each bore 60 includes an enlarged concentric part 62 at the end thereof positioned innermost in use, that is at the end interrupting the large diameter end of bore 23, thereby providing an inset shoulder 64 in each bore 60–62. Each of the bores 60 is screw threaded.

Each of the bushings 32 has formed in its large diameter end portion an arcuate recess 66 adapted to register with the large diameter portion 62 of a bore 60 in the hub, and preferably concentric with bore part 62 and of substantially the same diameter. Each recess 66 has its axis extending substantially parallel to the axis of the bushing and concentric with the bore 60 and extends lengthwise of the bushing for a depth greater than the depth of the part 62 of bore 60. Each recess 66 terminates in a shoulder 68 which is offset from the plane of the shoulder 64 of the hub when the bushing 32 is inserted in the hub. Two bores 60 are preferably provided in each hub and are preferably arranged substantially diametrically opposite, as shown in full lines in FIG. 1; however, more than two bores 60 may be provided, in which event the bores may be arranged in substantially equi-spaced relation and may consist of the two bores 61 shown dotted in FIG. 1, and the uppermost bore 60 shown in full lines which is spaced approximately 120° from each of the dotted bores 61.

Each of the bores 60 receives a threaded member, such as the threaded shank 70 of a cap screw having an enlarged head 72 of a diameter less than the diameter of the recess defined by the cooperating or complementary recesses 62–66. Head 72 is of an axial dimension less than the axial dimension of the recess 62 so that the head 72 of the cap screw will be inset in the hub when its inner surface abuts the shoulder 64.

It will be noted that the inner end face of the head 72 of the cap screw has slight clearance with the inner shoulder or end 68 of the recess 66 normally so as to avoid interference with free release of the tapered bushing in the tapered bore of the hub. At the same time, the relative movement of the bushing 32 and the hub is limited, so that any tendency of the hub to slide or move axially on the bushing when the parts are in released position and mounted upon a shaft will result in minimal eccentricity of the hub and its bushing at the time the inner end or face of the head 72 engages a shoulder 68 of the bushing. In other words, when each of the sections, units or sub-assemblies consisting of a hub, a bushing, and a clamping plate is assembled loosely, as in condition for application to a shaft, the hub and bushing are free to have slight relative movement, but otherwise are held together as a unit in substantially coaxial relation or with minimal eccentric displacement.

The flexible torque-transmitting member 10 which interconnects the two pre-assembled hub units is similar in shape to a tire, and preferably is split at 12 substantially radially thereof to facilitate mounting thereof to interconnect the two hub units or assemblies. Thus, the member 10 is substantially annular in shape and is of arcuate cross section. It is preferably formed of an elastomeric material, such as rubber or synthetic rubber, and may have reinforcing webs or fibers or filaments molded therein. Member 10 has two rim parts 11, each of which preferably has an exterior thickened bead 13 as shown in FIG. 4. One rim part 11 is annularly secured between the marginal portion of one clamp plate 46 and the rib 28 of the adjacent one of the hubs 20–21, and the other rim part 11 is similarly secured between the marginal portion of the opposite clamp plate 46 and the rib 28 of the opposite one of the hubs 20–21, as shown in FIG. 3.

The hub units or sections of the coupling are preferably pre-assembled by inserting in each hub a bushing 32 and retaining screws 70–72 and then connecting clamp plate 46 by means of cap screws 48. The parts will normally be assembled in the relation shown in FIG. 4, permitting easy application of the unit to the end portion of that one of the shafts 16–17 and permitting ready insertion of a bead 13 of the flexible member 10 between the rib 28 of the hub and the outer margin of the associated clamping plate 46 so that the flexible member 10 may assume substantially concentric relation to the hub.

After the two hub assemblies have been mounted upon the respective shafts and the flexible member 10 has each bead 56 positioned properly and concentrically relative to the hub sub-assembly which is to mount it, the coupling can be operatively conditioned by manipulating the screw threaded members 48. This is accomplished by rotating the screws 48 of each hub to advance the clamping plate 46 to a position gripping the margin of the flexible member 10 and approaching the large diameter end of the bushing 32 of sub-assembly. The parts are so proportioned that the final increment of advance of the clamping plate 46 in clamping direction to complete the effective frictional clamping engagement of the flexible member 10 with the associated hub and a clamping plate will occur after the plate 46 abuts the adjacent bushing 32 so as to simultaneously advance the bushing 32 to constrict it into operative frictional engagement with the shaft upon which it is mounted and with the hub within which it is seated. It will be observed that this action occurs without interference from the heads 72 of the screws 70 which are inset from the innermost face of the hub.

When it is desired to disconnect one of the shafts 16-17 from the other, the securing screws 48 of the hub mounted upon the shaft to be disconnected are rotated to release the clamping plate 46 from clamping engagement with the flexible member 10 and to separate the clamping plate 46 from contact or engagement with the bushing 32. This permits the freeing of the bushing 32 from its constricted frictional drive-transmitting engagement with the bore 23 of the hub and permits the bushing to move to expanded position free of the mounting shaft.

It will be apparent that by reason of the pre-assembly of the complementary hub, bushing, and clamping plate only three units need be handled as individual parts at the work site, namely two sub-assemblies and the flexible tire member 10. Likewise, it will be apparent that the components of each sub-assembly are maintained in substantially concentric position facilitating ready assembly with the tire member 10 without, however, interfering with requisite freedom and relative movement of the parts to accommodate quick, simple and easy mounting of the sub-assemblies upon the respective shafts to be connected and application of the flexible tire member 10 to the two sub-assemblies. At the same time, the mere act of applying the sub-assemblies and the tires preparatory to final clamping of the parts to operative position results in proper concentric relation thereof, so that no special care need be exercised to ensure required concentricity and operative relation. Also, it will be apparent that the operations of applying the coupling and of releasing it can be accomplished speedily and with minimum manipulations and with simple tools.

While the preferred embodiment of the invention has been illustrated and described, it will be understood that changes may be made in the coupling within the spirit of this invention.

What I claim is:

1. In a flexible coupling for connecting two substantially aligned rotatable shafts comprising a pair of hubs each encircling a split tapered bushing mounted on a shaft, said hubs being connected by an annular flexible torque-transmitting member whose opposite marginal portions are clamped to opposite hubs by clamp plates positioned on respective hubs by clamp advancing means, each clamp plate advancing a bushing to frictionally grip the cooperating shaft and hub simultaneously with clamping a margin of said flexible member, the improvement comprising a connector between each hub and its associated bushing for maintaining the hub and bushing substantially centered and with slight freedom for relative axial displacement.

2. The improvement defined in claim 1, wherein each associated hub and bushing have a tapered interfit and said hub has a plurality of threaded bores substantially parallel to its axis and adjacent its bushing, each of said bores having an enlarged portion at the end thereof adjacent the large diameter end of its bushing, the outer periphery of the large end of the bushing having a plurality of recesses registering and cooperating with said enlarged bore portion to define a recess, the portion of said recess within said bushing having a slightly greater axial depth than the remainder thereof, and a securing member anchored in each bore and having an enlarged head fitting in said recess with clearance and abutting the inner end of the enlarged portion of the bore.

3. The improvement defined in claim 2, wherein the head of said securing member has a lesser axial dimension than said enlarged bore portion.

4. A flexible coupling comprising a pair of hub units adapted to be mounted upon adjacent ends of substantially aligned shafts, and an annular flexible torque-transmitting member interconnecting said hub units, each hub unit comprising a rigid annulus having a tapered bore and an annular marginal clamp part, a tapered split bushing seated in said tapered bore and normally projecting from the large end of said bore, and a rigid annular clamp plate having an inner marginal portion abutting the large end of said bushing and an outer marginal portion clamping a margin of said annular flexible member against the annular clamp part of said annulus, means carried by said annulus for advancing said clamp plate, and means interconnecting said bushing and said annulus to accommodate limited relative axial movement and negligible relatively eccentric movement thereof.

5. A flexible coupling as defined in claim 4, wherein said interconnecting means is carried by said annulus and includes an enlarged head seated with lateral clearance in a recess having complementary parts thereof formed in said annulus and said bushing, the inner transverse end of said head abutting a surface of said annulus and having axial clearance with said bushing.

References Cited

UNITED STATES PATENTS

| | | | |
|---|---|---|---|
| 3,020,737 | 2/1962 | Firth | 64—11 |
| 3,283,535 | 11/1966 | Grundtner | 64—11 |
| 3,468,138 | 9/1969 | Downey | 64—11 |

KENNETH W. SPRAGUE, Primary Examiner